(12) United States Patent
Calderón-Urrea et al.

(10) Patent No.: US 11,369,111 B2
(45) Date of Patent: Jun. 28, 2022

(54) SYNERGISTIC COMPOSITION OF NEMATICIDE COMPRISING OF CHALCONES

(71) Applicant: TELLURIS BIOTECH INDIA PRIVATE LIMITED, Telangana (IN)

(72) Inventors: Alejandro Calderón-Urrea, Fresno, CA (US); Saeed Attar, Fresno, CA (US)

(73) Assignee: TELLURIS BIOTECH INDIA PRIVATE LIMITED, Telangana (IN)

( * ) Notice: Subject to any disclaimer, the term of this patent is extended or adjusted under 35 U.S.C. 154(b) by 155 days.

(21) Appl. No.: 16/610,385

(22) PCT Filed: Nov. 21, 2017

(86) PCT No.: PCT/IB2017/057288
§ 371 (c)(1),
(2) Date: Nov. 1, 2019

(87) PCT Pub. No.: WO2018/203117
PCT Pub. Date: Nov. 8, 2018

(65) Prior Publication Data
US 2021/0195896 A1    Jul. 1, 2021

(30) Foreign Application Priority Data
May 2, 2017  (IN) .............................. 201741015450

(51) Int. Cl.
A01N 43/10      (2006.01)
A01N 25/30      (2006.01)
A01N 35/04      (2006.01)

(52) U.S. Cl.
CPC ............. *A01N 43/10* (2013.01); *A01N 25/30* (2013.01); *A01N 35/04* (2013.01)

(58) Field of Classification Search
CPC ......... A01N 25/30; A01N 43/10; A01N 35/04
See application file for complete search history.

(56) References Cited

U.S. PATENT DOCUMENTS

2015/0366216 A1   12/2015 Pedersen et al.

OTHER PUBLICATIONS

Attar et al. (Ferrocenyl chalcones versus organic chalcones: A comparative study of their nematocidal activity, Bioorganic & Medicinal Chemistry 19 (2011) pp. 2055-2073) (Year: 2011).*
Nguyen et al. (Chalcone-based selective inhibitors of a C4 plant key enzyme as novel potential herbicides, published Jun. 6, 2016; Scientific Reports, 6:27333) (Year: 2016).*
Attar et al. "Ferrocenyl chalcones versus organic chalcones: A comparative study of their nematocidal activity", Bioorganic & Medicinal Chemistry, vol. 19, Issue 6, Mar. 15, 2011, pp. 2055-2073.
Caboni et al. "Nematicidal activity of acetophenones and chalcones against Meloidogyne incognita and structure-activity considerations", Pest Manag Sci. 2016. vol. 72, pp. 125-130.
Sissouma et al. "Synthesis and in vitro nematicidal activity of new chalcones vectorised by imidazopyridine", African Journal of Pharmacy and Pharmacology. 2011. vol. 5(18), pp. 2086-2093.
Gonzalez et al. "Effect of (E)-Chalcone on Potato-Cyst Nematodes (*Globodera pallida* and *G. rostochiensis*)", J. Agric. Food Chem. 1998. vol. 46, pp. 1163-1165.
PCT/IB2017/57288 International Search Report completed May 7, 2018.
PCT/IB2017/57288 Written Opinion completed May 7, 2018.
Richer, "Synergism—a Patent View*", Pestic. Sci., (1987), vol. 19, pp. 309-315.
Colby, "Calculating Synergistic and Antagonistic Responses of Herbicide Combinations", Weeds, (Jan. 1967), vol. 15, No. 1, pp. 20-22.

* cited by examiner

*Primary Examiner* — Robert A Wax
*Assistant Examiner* — Danielle Sullivan
(74) *Attorney, Agent, or Firm* — Venable LLP; Keith G. Haddaway

(57) ABSTRACT

The present invention provides a synergistic composition of a nematicide comprising of combination of chalcones, chalcone 17 and chalcone 25, or chalcone 17 and chalcone 30 with potent nematicidal and nematostatic properties. The chalcones individually show 100% nematicidal activity at a concentration as high as $10^{-2}$-$10^{-3}$ M, whereas, the combination of chalcone 17 and chalcone 25, or chalcone 17 and chalcone 30, show 100% nematicidal activity at concentration as low as $10^{-4}$-$10^{-6}$ M bringing a synergistic effect, wherein the ratio of the chalcones is 1:1. These combinations of the chalcones also show potent nematostatic activity compared to each chalcone individually. This synergistic nematicidal composition is environmentally safe and non-toxic to humans and animals.

12 Claims, 10 Drawing Sheets

SYNERGISTIC COMPOSITION OF NEMATICIDE COMPRISING OF CHALCONES

FIELD OF THE INVENTION

The present invention relates to nematicides, which are compositions used in agricultural field for killing plant parasites, specifically nematodes. More specifically, the invention relates to a synergistic composition of a nematicide comprising of combination of chalcones having nematicidal and nematostatic properties.

BACKGROUND OF THE INVENTION

Nematodes are a major threat to the agricultural industry as they cause heavy losses to the yield, thereby, affecting the economy in a significant way. Nematodes are second to insects which are known to cause severe damage to vegetable crops such as tomatoes, cucurbits, potatoes, fruit crops such as citrus, coconuts, guava, grapes and pomegranate, food grains such as rice, and wheat, commercially important crops such as cotton and tobacco, ornamental flowering plants such as Gerbera and rose. Nematodes alone or in combination with other soil microorganisms have been found to attack almost every part of the plant including roots, stems, leaves, fruits and seeds. They cause a projected yield loss of 12.3% ($157 billion dollars) worldwide, out of which $40.3 million is reported from India (Singh et al., 2015).

Root-knot nematodes which belong to the *Meloidogyne* genus are one of the three most economically damaging genera of plant-parasitic nematodes on horticultural and field crops. They are obligate parasites of the roots of several plants; and *Meloidogyne incognita* is amongst the major pest worldwide.

Nematicides are compositions which are used to kill these plant parasitic nematodes. Most of the nematicides used are chemical compositions which are highly toxic to humans and are also detrimental to useful soil bacteria. Several nematicides have also shown to contaminate groundwater, and cause depletion of the ozone layer. One of the well-known nematicide, methyl-bromide, has been banned in several countries including USA and India. Another highly toxic nematicide which is widely used in field crops is carbofuran which is being phased out in several countries due to its detrimental effects on birds and honey bees. Nematicides such as phorate can easily go through the soil into the groundwater and contaminate it.

The severe drawbacks associated with chemical nematicides necessitate the development of novel technologies for controlling nematodes. One such method is generating transgenic plant lines which express the transgenic genes for resistance against nematodes. However, this is time consuming and expensive method which requires extensive prior research activities. In many countries there is fierce objection to introduction of transgenic lines.

One effective method involves generation of compositions of nematicides which are environmentally safe, non-toxic, and easy to generate and use.

Chalcones or chalconoids are a group of naturally occurring compounds that have a central core comprising of an aromatic ketone and an enone; and are derivatives of the parent compound (2E)-1,3-diphenyl-2-propen-1-one. Chalcones and their derivatives are molecules with a broad-spectrum of biological activities. Chalcones have been known to possess anti-retroviral, anti-inflammatory, anti-parasitic, anti-malarial, anti-fungal, anti-protozoal, anti-bacterial, and anti-tumor properties. Several types of chalcones are known to exist naturally in a variety of dicotyledonousandmonocotyledonous plants, pteridophytes and gymnosperms. Since chalcones and chalcone-like structures exist naturally in many plants, it makes them eco-friendly; and their association with several biological activities greatly increases their potential use in agriculture.

Chalcone, (2E)-1,3-Diphenylprop-2-en-1-one, has a chemical formula $C_{15}H_{12}O$, and other chalcones are generally derivatives of this parent compound with a structure of Formula X:

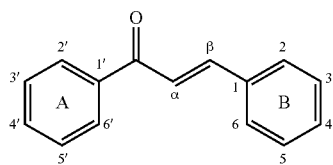

FORMULA X

Chalcone structure is composed of two aromatic rings, Ring A and Ring B, that are joined by a three-carbon α, β-unsaturated carbonyl system. At least thirty naturally occurring chalcones are known with several types of chemical groups attached to Ring A or B.

Table 1 provides the structures of thirty several types of chalcones, chalcone 1 to chalcone 30, wherein the basic structure is that provided in Formula X.

TABLE 1

Name and structure of naturally occurring chalcones

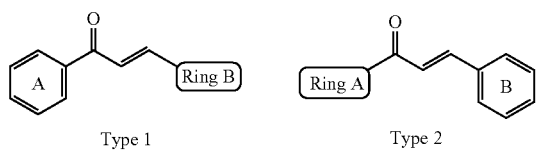

TABLE 1-continued

Name and structure of naturally occurring chalcones

| Name of chalcone and its structure (Variation in Ring B) | | Number of chalcone and its structure (Variation in Ring A) | |
|---|---|---|---|
| Type 1 | | Type 2 | |
| Name | Structure of Ring B | Name | Structure of Ring A |
| 4 | naphthalene | 15 | 2-chlorophenyl |
| 5 | 2-chlorophenyl | 16 | 3-chlorophenyl |
| 6 | 4-nitrophenyl | 17 | 2,4-dichlorophenyl |
| 7 | 2-methoxyphenyl | 18 | 4-fluorophenyl |
| 8 | 2-Ph₂P-phenyl | 19 | 2,4-difluorophenyl |
| 9 | 2-pyridyl | 20 | 4-nitrophenyl |
| 10 | 3-pyridyl | 21 | 2-methoxyphenyl |
| 11 | 4-pyridyl | 22 | 3,4-dimethoxyphenyl |
| | | 23 | 3,4-dimethoxyphenyl |
| | | 24 | 3,4,5-trimethoxyphenyl |
| | | 25 | 4-ethoxyphenyl |
| | | 26 | 4-butoxyphenyl |
| | | 27 | 2-pyridyl |
| | | 28 | 3-pyridyl |
| | | 29 | 2-furyl |
| | | 30 | 2-thienyl |

Attar et al., have shown that chalcones are known to have nematicidal activity, however, the efficacy of individual chalcones varies a lot, ranging from as low as 5% to as high as 100% nematicidal activity at different concentrations. Moreover, the effect of chalcones was tested only on the non-parasitic model nematode *Caenorhabditis elegans*. The activity of individual chalcones was seen at concentrations higher than $10^{-2}$ M. The use of higher concentrations of compounds for minimum inhibitory effect becomes very limited due to toxicity, soil contamination, seepage to ground water, and other related problems.

A group of chalcones can be collectively presented as structural Formula 1:

FORMULA 1

Chalcone 17 has the chemical name (2E)-1-(2,4-Dichlorophenyl)-3-phenyl-2-propen-1-one and formula as shown in Formula 2:

FORMULA 2

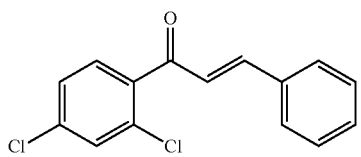

Chalcone 25 has the chemical name (2E)-1-(4-Ethoxyphenyl)-3-phenyl-2-propen-1-one and formula as shown in Formula 3:

FORMULA 3

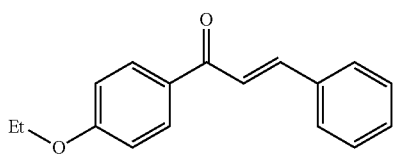

Chalcone 30 has the chemical name (2E)-3-Phenyl-1-(2-thienyl)-2-propen-1-one and formula as shown in Formula 4:

FORMULA 4

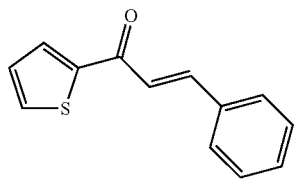

Chalcone 17, chalcone 25, and chalcone 30 have individually shown nematicidal activity against *C. elegans*, under laboratory conditions at a concentration of $10^{-4}$ M. However, their effect in an agricultural field against root-knot nematodes, and on growth of treated plants is unknown. Generally, most of the nematicides have an adverse effect on plant growth and are also harmful to important soil bacteria which are required for the healthy growth of a plant. As known in the state of the art, use of chalcones has its own challenges that are not limited to economical aspects, toxic concentrations and adverse effects on plant growth as well as environment.

The present invention considers the drawbacks of prior art and provides a method for controlling nematodes using a composition comprising of a combination of chalcones at very low concentrations, making them environmentally safe for practical use.

OBJECT OF THE INVENTION

Accordingly, the main object of the invention is to provide a synergistic composition of a nematicide.

Another object of the invention is to provide a synergistic nematicidal composition comprising a combination of chalcones.

Yet another object of the invention is to provide a synergistic nematicidal composition, wherein the concentration of the chalcones is in the range of $10^{-4}$-$10^{-6}$ M.

Yet another object of the invention is to provide a synergistic nematicidal composition, wherein the concentration of the chalcones in the range of $10^{-4}$-$10^{-6}$ M is sufficient to show nematicidal activity on root-knot nematodes.

Yet another object of the invention is to provide synergistic nematicidal composition which is not detrimental to beneficial soil microorganisms.

Yet another object of the invention, is to provide synergistic nematicidal composition which shows a phytotonic effect on plants in addition to controlling root-knot nematode populations.

SUMMARY OF THE INVENTION

The present invention relates to a composition of a nematicide to be used in agricultural purposes for controlling plant parasites, specifically nematodes. More specifically, the invention relates to a synergistic composition of a nematicide comprising a combination of chalcones.

In the main embodiment, the invention provides a synergistic composition of a nematicide comprising of a combination of chalcones which belong to group of compounds called chalcones or chalconoids, and are derivatives of the parent compound 1,3-diphenyl-2-propen-1-one. More specifically, the invention provides composition of the nematicide comprising of combination of at least two chalcones, wherein the combination comprises of:
1. chalcone 17 {(2E)-1-(2,4-Dichlorophenyl)-3-phenyl-2-propen-1-one}, and chalcone 25 {(2E)-1-(4-Ethoxyphenyl)-3-phenyl-2-propen-1-one}; or
2. chalcone 17 {(2E)-1-(2,4-Dichlorophenyl)-3-phenyl-2-propen-1-one}, and chalcone 30 {(2E)-3-Phenyl-1-(2-thienyl)-2-propen-1-one};

wherein
the ratio of the chalcones is 1:1; and
the chalcones are derivatives of the compound (2E)-1,3-diphenyl-2-propen-1-one having structural Formula 1:

Formula 1

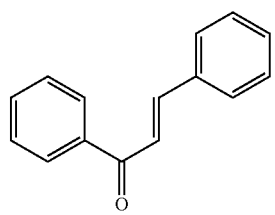

Chalcones are known to show nematicidal activity, however, most of them show activity at concentration as high as $10^{-2}$M. Moreover, exposure of nematodes with individual chalcones takes 24-30 hrs for paralyzing the nematodes and a minimum of 5 days to induce nematode mortality. The present invention provides a synergistic composition of combination of chalcones with effective nematicidal activity at concentrations as low as $10^{-4}$-$10^{-6}$ M., where paralytic effects in the nematodes is visible within 2 hrs and nematode mortality is induced in 24 hrs.

In yet another embodiment, the invention provides a synergistic composition of nematicides comprising of chalcones, wherein the use of the nematicide comprising of chalcones on plants at a concentration of 5-40 mg per plant is significantly effective in showing nematicidal and nematostatic activity against nematodes in the soil, and limiting the number of nematode-induced gall formation on roots of treated plants. Hence, the synergistic combination of at least two chalcones acts as a potent and highly economical nematicidal composition.

BRIEF DESCRIPTION OF DRAWINGS

A complete understanding of the method of the present invention may be obtained by reference to the following drawings.

DETAILED DESCRIPTION OF THE INVENTION

Figure 1:
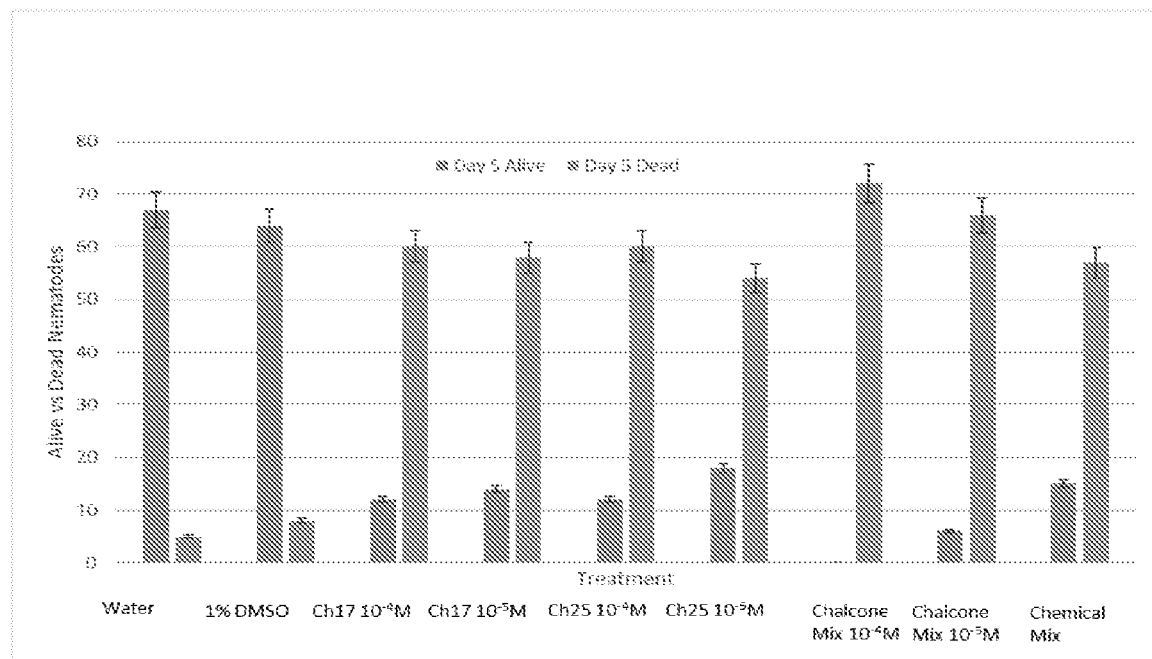
FIG. 1 is a graphical representation of the effect of combination chalcone 17 and chalcone 25 on nematodes in a 96-well plate experiment.

The present invention will now be described in detail hereinafter. This invention may, however, be embodied in many different forms and should not be construed as being limited to the embodiment set forth herein. Rather, the embodiment is provided so that this disclosure will be thorough, and will fully convey the scope of the invention to those skilled in the art.

The term "nematicide" used herein, refers to a compound or a combination of compounds which have nematicidal and/or nematostatic activities.

The term "phytotonic effect" used herein, refers to the additional positive advantages shown by use of a specific compound or combination of compounds in growth and development of treated plants or crops other than the direct effect for which the input/process has been used.

The present invention relates to a synergistic composition comprising of active compounds with nematicidal activity, specifically against root-knot nematodes, and which show phytotonic effect on treated crops. More specifically, the present invention relates to a synergistic composition of nematicides comprising of combination of chalcones. The synergistic combination of chalcones is unique, highly potent as a nematicidal composition, and economical compared to other existing methods for nematode control. Though, the chalcones individually show nematicidal activity, the combination of at least two chalcones increases the efficacy, brings a synergistic effect, and significantly reduces the amount of chalcones required for nematicidal activity, thus, reducing the cost of production of the composition. As an added advantage, the synergistic composition of chalcones has a phytotonic effect on treated crops showing improvement in at least length of plant shoots and leaves, and number of flowers and fruits borne by the crop.

The present invention relates to a synergistic composition for controlling nematodes comprising an effective amount of a compound of Formula 2

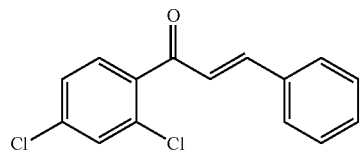 [SMILES: O=C(/C=C/c1ccccc1)c1ccc(Cl)cc1Cl]

having 100% anti-nematode efficacy at a concentration of $10^{-2}$-$10^{-3}$ M; and an effective amount of a compound of Formula 1

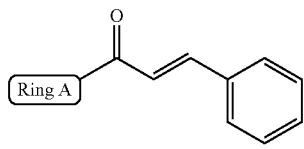

wherein
Ring A is

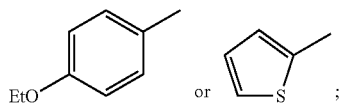

having 100% anti-nematode efficacy at a concentration of $10^{-2}$-$10^{-3}$M,
wherein,
the Formula 1 and Formula 2 are in a ratio of 1:1;
the composition has synergistic anti-nematode efficacy of 100% at a concentration of $10^{-4}$-$10^{-6}$M; and
the composition has low activity against soil microorganisms.

In the main embodiment of the present invention, the invention provides a nematicide composition comprising of chalcones, wherein said nematicide composition is a synergistic combination of at least two chalcones, comprising of:
1. chalcone 17 {(2E)-1-(2,4-Dichlorophenyl)-3-phenyl-2-propen-1-one}, and chalcone 25 {(2E)-1-(4-Ethoxyphenyl)-3-phenyl-2-propen-1-one}; or
2. chalcone 17{(2E)-1-(2,4-Dichlorophenyl)-3-phenyl-2-propen-1-one}, and chalcone 30 {(2E)-3-Phenyl-1-(2-thienyl)-2-propen-1-one};

the ratio of selected chalcones is 1:1; and
the chalcones are derivatives of the compound (2E)-1,3-diphenyl-2-propen-1-one having a structural Formula 1:

Formula 1

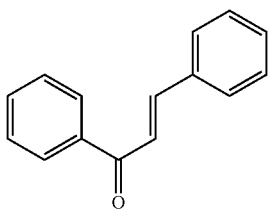

Individually the chalcones showed 100% nematicidal activity at concentrations as high as $10^{-2}$-$10^{-3}$ M over a period of up to 3 days. The proposed composition comprising in a specific combination, chalcone 17 and chalcone 25, or chalcone 17 and chalcone 30, a 100% nematicidal activity is seen at a concentration of $10^{-4}$-$10^{-6}$ M within one day. The chalcones individually take around 24-30 hrs to paralyze the nematodes (nematostatic activity) and 72-12 hrs to induce nematode mortality (nematicidal activity), whereas the synergistic combination of chalcone 17 and chalcone 25, or chalcone 17 and chalcone 30, paralyze the nematodes within 2 hrs and induce nematode mortality in 24 hrs. Thus, the proposed combination of chalcones acts a potent nematostatic and nematicidal composition. A nematicidal composition having potent nematostatic properties is a highly desirable feature which enables the composition to act on the parasites at a very early stage. Hence the proposed synergistic composition of a nematicide has significantly high nematostatic properties and is highly economical.

The nematicidal composition further comprises at least one extender, an emulsifier and/or surfactant.

The nematicidal composition includes agrochemical active compound such as substances capable of treating plants, fungicides, bactericides, insecticides, acaricides, nematicides, molluscicides, safeners, plant growth regulators, plant nutrients and biological control agents.

In another embodiment, the invention advantageously provides a composition of nematicides comprising of chalcones, wherein the chalcones show nematicidal and nematostatic properties, however, the chalcones do not show a severe effect on other beneficial soil microorganisms. More specifically, the chalcones at a concentration of $10^{-4}$-$10^{-6}$ M showed 100% nematicidal activity, but showed significantly less activity against soil microorganisms such as *Pseudomonas aeruginosa* and *Bacillus subtilis*.

In yet another embodiment, the invention advantageously provides a synergistic composition of nematicides comprising of chalcones, wherein the use of the nematicide comprising of chalcones showed a phytotonic effect on treated crops by not limiting the growth or the productivity of the crops, in fact improved the overall productivity of the treated crops. The application of the said composition of nematicide comprising of chalcones, at a concentration of 5-40 mg per plant does not adversely affect the overall growth or productivity of the plant including the growth of shoot, leaf length, and number of flowers and fruits borne by the plant.

In yet another embodiment, the invention provides a synergistic composition of nematicides comprising of chalcones, wherein the use of the nematicide comprising of chalcones on plants has either severe nematicidal and/or nematostatic effects on plant parasitic nematodes in the soil. The application of the said composition of nematicide comprising of chalcones, at a concentration of 5-40 mg per plant killed around 95% of the nematodes in the soil, disfigured live nematodes, and no new juvenile nematodes were observed. The nematicide comprising of chalcones was significantly more effective than the chemical nematicide, carbofuran, and the biological nematicides, *Heterorhabditis indica* (entomo-pathogenic nematodes), and the nematicidal fungus *Paecilomyces lilacinus*.

In yet another embodiment, the invention advantageously provides a synergistic composition of nematicides comprising of chalcones, wherein the use of the nematicide comprising of chalcones on plants severely limited the growth and number of nematode-induced galls. Gall formation was very low on the roots of treated plants compared to untreated plants and plants treated with other well-known nematicides such as the chemical nematicide, carbofuran, and biological nematicides, entomopathogenic nematodes *Heterorhabditis indica*, and *Paecilomyces lilacinus*.

In another embodiment of the invention, the nematicidal composition further comprises compounds capable of showing a multisite action, for example bordeaux mixture, captafol, captan, chlorothalonil, copper hydroxide, copper naphthenate, copper oxide, copper oxychloride, copper(2+) sulfate, dichlofluanid, dithianon, dodine, dodine free base, ferbam, fluorofolpet, folpet, guazatine, guazatine acetate, iminoctadine, iminoctadine albesilate, iminoctadine triacetate, mancopper, mancozeb, maneb, metiram, metiram zinc, oxine-copper, propamidine, propineb, sulphur and sulphur preparations including calcium polysulphide, thiram, tolylfluanid, zineb and ziram.

In another embodiment of the invention, the nematicidal composition further comprises compounds capable to induce a host defence, for example acibenzolar-5-methyl, isotianil, probenazole and tiadinil.

In another embodiment of the invention, the nematicidal composition further comprises inhibitors of the lipid and membrane synthesis, for example biphenyl, chloroneb, dicloran, edifenphos, etridiazole, iodocarb, iprobenfos, isoprothiolane, propamocarb, propamocarb hydrochloride, prothiocarb, pyrazophos, quintozene, tecnazene and tolclofos-methyl.

The active compound combinations and the nematicidal compositions of the present invention may further comprise at least one other additional component such as auxiliaries, solvents, carriers or supports, filler, surfactants or extenders, all being agriculturally acceptable. According to a preferred embodiment of the invention, the active compound combinations and the nematicidal compositions of the present invention further comprise auxiliaries, solvents, carriers, surfactants and/or extenders.

According to the invention the term "support" or "carrier" includes a natural or synthetic, organic or inorganic substance which is mixed or combined with the active compounds for better applicability, for application to plants or plant parts or seeds. The support or carrier, which may be solid or liquid, is generally inert and should be suitable for use in agriculture. Suitable solid or liquid carriers/supports include for example ammonium salts and natural ground minerals, such as kaolins, clays, talc, chalk, quartz, attapulgite, montmorillonite or diatomaceous earth, and ground synthetic minerals, such as finely divided silica, alumina and natural or synthetic silicates, resins, waxes, solid fertilizers, water, alcohols, especially butanol, organic solvents, mineral oils and vegetable oils, and derivatives thereof. It is also possible to use mixtures of such supports or carriers. Solid supports/carriers suitable for granules are: for example, crushed and fractionated natural minerals, such as calcite, marble, pumice, sepiolite, dolomite, and synthetic granules of inorganic and organic meals and also granules of organic material, such as sawdust, coconut shells, maize cobs and tobacco stalks. Suitable liquefied gaseous extenders or carriers are liquids which are gaseous at ambient temperature and under atmospheric pressure, for example aerosol propellants, such as butane, propane, nitrogen and carbon dioxide. Tackifiers, such as carboxymethylcellulose and natural and synthetic polymers in the form of powders, granules and latices, such as gum arabic, polyvinyl alcohol, polyvinyl acetate, or else natural phospholipids, such as cephalins and lecithins and synthetic phospholipids can be used in the formulations. Other possible additives are mineral and vegetable oils and waxes, optionally modified. If the extender used is water, it is also possible for example, to use organic solvents as auxiliary solvents. Suitable liquid solvents are essentially: aromatic compounds, such as xylene, toluene or alkylnaphthalenes, chlorinated aromatic compounds or chlorinated aliphatic hydrocarbons, such as chlorobenzenes, chloroethylenes or methylene chloride, aliphatic hydrocarbons, such as cyclohexane or paraffins, for example mineral oil fractions, mineral and vegetable oils, alcohols, such as butanol or glycol, and also ethers and esters thereof, ketones, such as acetone, methyl ethyl ketone, methyl isobutyl ketone or cyclohexanone, strongly polar solvents, such as dimethylformamide and dimethyl sulphoxide, and also water.

In yet another embodiment of the present invention, the composition further comprises "surfactant" that includes an emulsifier, a dispersing agent or a wetting agent of ionic or non-ionic type or a mixture of such surfactants. Mention may be made, for example, of polyacrylic acid salts, lignosulphonic acid salts, phenolsulphonic or naphthalenesulphonic acid salts, polycondensates of ethylene oxide with fatty alcohols or with fatty acids or with fatty amines, substituted phenols (in particular alkylphenols or arylphenols), salts of sulphosuccinic acid esters, taurine derivatives (in particular alkyl taurates), phosphoric esters of polyoxyethylated alcohols or phenols, fatty acid esters of polyols, and derivatives of the above compounds containing sulphate, sulphonate and phosphate functions. Preferably, surfactant content may be comprised between 5% and 40% by weight of the composition.

Additional components may also be included, e.g. protective colloids, adhesives, thickeners, thixotropic agents, penetration agents, stabilisers, sequestering agents. More generally, the active materials can be combined with any solid or liquid additive, which complies with the usual formulation techniques.

In general, the compositions according to the invention may contain from 0.05 to 99% (by weight) of active material, preferably 10 to 70% by weight.

The nematicidal composition according to the present invention can be used in various forms such as aerosol dispenser, capsule suspension, cold fogging concentrate, dustable powder, emulsifiable concentrate, emulsion oil in water, emulsion water in oil, encapsulated granule, fine granule, flowable concentrate for seed treatment, gas (under pressure), gas generating product, granule, hot fogging concentrate, macrogranule, microgranule, oil dispersible powder, oil miscible flowable concentrate, oil miscible liquid, paste, plant rodlet, powder for dry seed treatment, seed coated with a pesticide, soluble concentrate, soluble powder, solution for seed treatment, suspension concentrate (flowable concentrate), ultra-low volume (ulv) liquid, ultra-low volume (ulv) suspension, water dispersible granules or tablets, water dispersible powder for slurry treatment, water soluble granules or tablets, water soluble powder for seed treatment and wettable powder.

These compositions include not only compositions which are ready to be applied to the plant or seed to be treated by means of a suitable device, such as a spraying or dusting device, but also concentrated commercial compositions which must be diluted before they are applied to the crop.

EXAMPLE 1

Procedural Methodology

A) *M. incognita* Propagation

Tomato plants were inoculated with *M. incognita* juveniles and maintained in a growth chamber. After at least two months, the *M. incognita* eggs were extracted from the roots for experiments. The procedure followed for extracting *M. incognita* eggs is explained below.

The root tissues were either chopped by hand using a surgical blade and a watch glass, or it was chopped up using a food processor. The chopped tissue was then placed in a bottle and washed with a 10% dilution of bleach. Under sterile conditions, the root solution was then poured through sieves (60 count sieve on top, 500 count sieves on the bottom). The crude egg collection was collected from the bottom of the 500-count sieve into 5 mL each of bleach and egg mixture in 15 mL Falcon tubes. 5 mL of 70% sucrose solution was then placed in each Falcon tube. A 1 mL layer of double distilled sterile water was then gently placed on top of the sucrose mixtures in each Falcon tube. The samples were then centrifuged for 5 minutes at 1200 rpm. The embryos that were suspended between the sucrose solution and the 1 mL water layer were collected in a total of 3 mL (top layer of 3 mL of the solution) from each Falcon tube into fresh 15 mL Falcon tubes. 10 mL of a 5% bleach solution was added and the eggs were vortexed for 10 minutes. The Falcon tubes were then centrifuged for 5 minutes at 2000 rpm. The supernatant was then removed, and the eggs were rinsed in 10 mL of sterile double distilled water and re-centrifuged for 5 minutes at 2000 rpm. This process was repeated two or more times. After the last wash, 5 mL of supernatant was removed, while the remaining 5 mL of water was mixed with the eggs and placed into a 5 mL Petri dish. The eggs were then placed in an incubator at 25-27° C., and juvenile worms (J2 stage) hatched after about 10 days. The worms were kept in a 25-27° C. incubator for storage.

B) Preparation of Testing Solutions and Placement of Nematodes

The chalcone to be tested was placed in a 1.5 mL Eppendorf tube, and 1 mL of dimethyl sulfoxide (DMSO) was added to make a $10^{-1}$ M solution. This stock solution was used for further dilutions in sterile double distilled water ($10^{-4}$ M to $10^{-5}$M). For instance, 10 μL of $10^{-1}$ M chalcone in DMSO solution was added to 9990 μL of sterile double distilled water to make a $10^{-4}$ M solution for assays with the nematodes. 100 μL of the dilutions in water were pipetted into 30 wells of a 96 well plate and one worm was transferred into each well from a stock of extracted J2 $M.$ $incognita$. For a negative control, to confirm that the concentration of DMSO was not killing the nematodes, 30 worms were placed in 100 μL of 1% DMSO in sterile double distilled water for each experiment (past work has demonstrated that $C.$ $elegans$ worms can survive at this concentration of DMSO (Attar et al., 2011).

C) Monitoring Nematodes

The bioassay is designed to test the ability of the peptides, and chalcones, to kill the worms (% mortality). Each test was performed in a 96-well plate with one nematode in each well (30 wells total). The nematodes were incubated in the treatment solutions for 5 days. Viability of the nematodes was tested under a dissecting microscope by examining each for movement after disturbance with a probe.

EXAMPLE 2

Efficacy of the Nematicidal Composition

As described earlier, equal number nematodes were incubated in various treatment solutions in a 96-well plate for 5 days. The number of nematodes dead or surviving on Day 5 was counted. Results of the experiment are summarized in FIG. 1 which depicts a graph showing the effect of treatment of combination comprising of chalcone 17 and chalcone 25 against nematodes in 96-well plates. FIG. 2 depicts a graph showing the effect of treatment of combination comprising of chalcone 17 and chalcone 30 against nematodes in 96-well plates.

Figure 2:
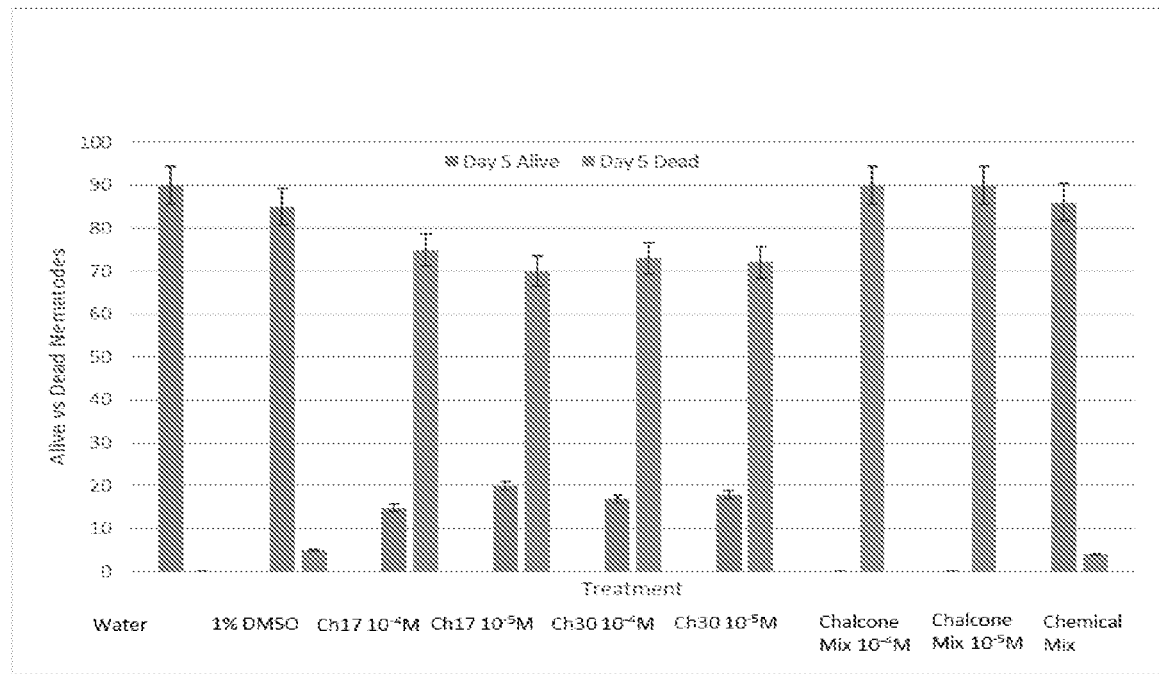
FIG. 2 is a graphical representation of the effect of combination chalcone 17 and chalcone 30 on nematodes in a 96-well plate experiment.

As depicted in FIG. 1, and FIG. 2 incubation of J2 stage juvenile nematodes in water, or 1% DMSO caused less than 10% death of nematodes on Day 5, and these treatments served as negative controls. Whereas, incubation of juvenile nematodes in a chemical mixture comprising of chlorpyriphos and imidacloprid (1:1 ratio) resulted in around 50% death on Day 5 which served as a positive control. Treatment juvenile nematodes with chalcone 17, or chalcone 25, or chalcone 30 alone caused between 80-85% death at concentration of around $10^{-4}$-$10^{-5}$ M by Day 5. Whereas, treatment of juvenile nematodes with combination of chalcone 17 and chalcone 25, or chalcone 17 and chalcone 30 caused nearly 100% death of nematodes by Day 5, wherein total concentration of chalcones was $10^{-4}$-$10^{-5}$ M and the chalcone ratio was 1:1. In fact, application of the combination of chalcone 17 and chalcone 25, or chalcone 17 and chalcone 30 caused nearly 100% death of nematodes in three days itself. Application of the combination chalcone 17 and chalcone 25 (TA) at a dose of $10^{4}$M is sufficient to kill 100% of the nematodes in a 96-well plate experiment. Application of the combination chalcone 17 and chalcone 30 (TB) at a dose of $10^{-4}$M and $10^{-5}$M is sufficient to kill 100% of the nematodes in a 96-well plate experiment.

These results suggest that the combination of chalcones, either chalcone 17 and chalcone 25, or chalcone 17 and chalcone 30, at a concentration as low as $10^{-4}$-$10^{-5}$ M has a synergistic effect on killing nematodes and are highly potent as nematicidal compositions.

This clearly shows that the chalcone combination chalcone 17 and chalcone 25 (TA), chalcone 17 and chalcone 30 (TB) are highly potent in inducing nematode mortality.

EXAMPLE 3

Effect of Chalcones on Common Microorganisms

Two common soil microorganisms ($Pseudomonas$ $aeruginosa$ and $Bacillus$ $subtilis$) and two common laboratory microorganisms ($Escherichia$ $coli$, and $Saccharomyces$ $cerevisiae$) were tested for the effects of individual chalcones. Microorganisms were grown on nutrient agar plates containing $10^{-4}$, $10^{-5}$, or $10^{-6}$ M concentrations of chalcones and Colony Forming Units (CFU) were counted after 24-48 hours of growth in nutrient agar plates.

TABLE 2

Effect of chalcones on common microorganisms

| | Organism | | | |
|---|---|---|---|---|
| Treatment | P. aeruginosa (Gram negative) | B. subtilis (Gram positive) | E. coli (Gram negative) | S. cerevisiae |
| YM | 100.0 | 100.0 | 100.0 | 100.0 |
| DMSO | 97.2 | 96.4 | 101.2 | 95.5 |
| Chalcone 17 ($10^{-4}$ M) | 55.8 | 69.0 | 115.4 | 97.0 |
| Chalcone 17 ($10^{-5}$ M) | 53.9 | 51.4 | 131.3 | 82.8 |
| Chalcone 17 ($10^{-6}$ M) | 56.0 | 50.8 | 97.3 | 106.7 |
| Chalcone 25 ($10^{-4}$ M) | 148.8 | 55.1 | 52.3 | 97.8 |
| Chalcone 25 ($10^{-5}$ M) | 148.1 | 55.9 | 69.6 | 125.4 |
| Chalcone 25 ($10^{-6}$ M) | 141.2 | 83.6 | 103.3 | 90.3 |

Chalcone 17 appeared to limit the growth of the two soil microorganisms tested (*P. aeruginosa, B. subtilis*) but not the growth of *E. coli* and *S. cerevisiae* (Table 1). On the other hand, chalcone 25 appeared to promote the growth of *P. aeruginosa*, limit the growth of *B. subtilis*, and does not affect the growth of *E. coli* or *S. cerevisiae*.

Overall, the individual chalcones had limited effect on other microorganisms as compared to their effect on parasitic nematodes.

EXAMPLE 4

Effect of Combination of Chalcone 17 and 25, or Chalcone 17 and 30 on Growth of Plants Nearly 4500 plants of cucumber crop in a poly house were used to study the effect of chalcone combinations on overall plant growth compared to untreated plants and plants treated with positive controls: Carbofuran (a well-known and widely used chemical nematicide), Nema power (Biological nematicide—Entomopathogenic nematodes (EPN), *Heterorhabditis indica*), and nematicidal fungus *Paecilomyces lilacinus*. The soil type was red sandy soil.

The following chemical solutions were used to study the effect of each chemical or combination of chemical on overall plant growth as provided in Table 3.

TABLE 3

Chemicals and their combinations used on plants

| S. No | Treatment | Dose of chemical ml or mg/plant | Dose of chemical mg/plant |
|---|---|---|---|
| 1 | Untreated control (UTC) | 0 | 0 |
| 2 | Chalcone 17 | 200 ml | 60 mg |
| 3 | Chalcone 25 | 200 ml | 60 mg |
| 4 | Chalcone 30 | 200 ml | 60 mg |
| 5 | Chalcone 17 and chalcone 25 combination TA-50 mg/L | 10 mg in 200 ml water | 10 mg |
| 6 | TA-100 mg/L | 20 mg in 200 ml water | 20 mg |
| 7 | TA-150 mg/L | 30 mg in 200 ml water | 30 mg |
| 8 | Chalcone 17 and chalcone 30 combination TB-50 mg/L | 10 mg in 200 ml water | 10 mg |
| 9 | TB-100 mg/L | 20 mg in 200 ml water | 20 mg |
| 10 | TB-150 mg/L | 30 mg in 200 ml water | 30 mg |
| 11 | *Paecilomyces lilacinus* | $10^9$CFU | $10^9$CFU |
| 12 | Carbofuran | Broadcast | 45 mg |
| 13 | Nema power (EPN) | $10^6$CFU | $10^6$CFU |

Wherein for easy interpretation:
UTC is untreated control plants;
TA is combination of chalcone 17 and chalcone 25; and
TB is combination of chalcone 17 and chalcone 30.

The effect of the chemicals or the biological nematicides was studied on plants and data was collected on Day 10, 21, and 35. The following example provides representative data of effect of chemicals or biological nematicides as provided in Table 3 on Day 10, 21, and 35.

A) Effect on Length of Plant Shoots

Figure 3:
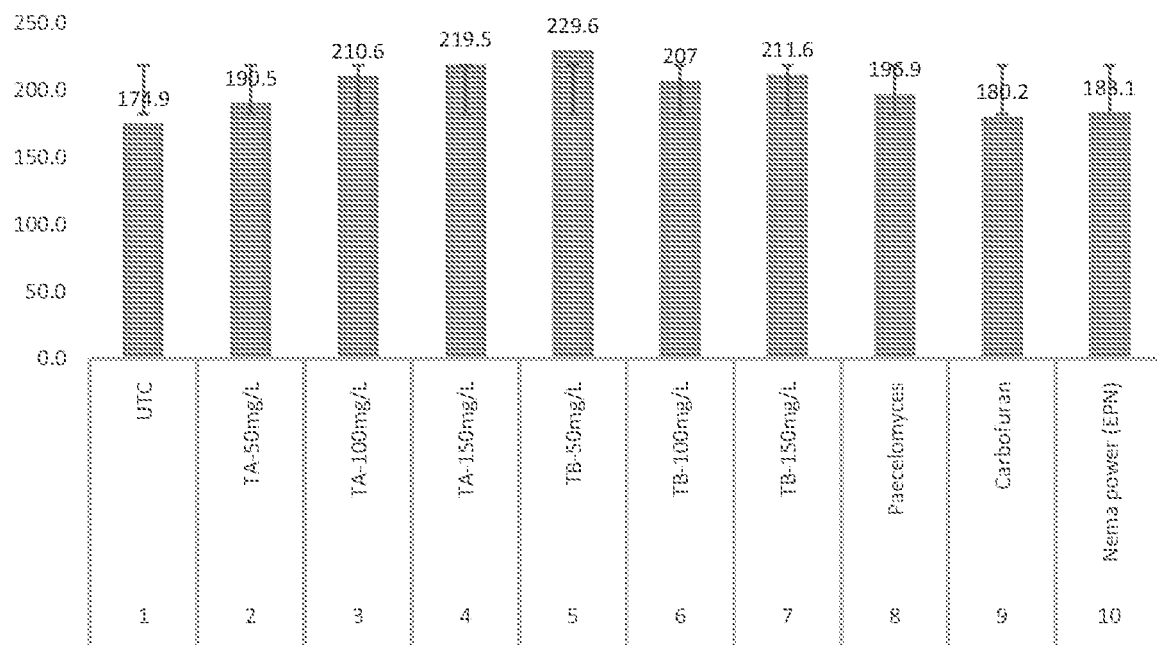
FIG. 3 is a graphical representation of the effect of chemicals or biological nematicides, as provided in Table 3, on length of plant shoots on Day 10 of treated plants as compared to untreated plants.

FIG. 3 is a graphical representation of effect of chemicals or biological nematicides, as provided in Table 3, on length of plant shoots on Day 10 of treated plants as compared to untreated plants. As depicted in FIG. 3, the application of the combinational composition chalcone 17 and chalcone 30(TB50) at a dose of 10 mg per plant has shown high efficacy in maintaining the vegetative growth of plants. A 32% increase in shoot length was observed in TB50 when compared to untreated plants (control-UTC).

Similarly, the application of the combinational composition of chalcone 17 and chalcone 25 (TA150) at a dose of 30 mg per plant also showed a high efficacy in maintaining the vegetative growth of plants. A 21% increase in shoot length was observed in TA150 treated plants as compared to untreated plants.

The chemical positive control carbofuran, or the biological positive controls EPN and *Paecilomyces lilacinus* did not show similar positive effect on the vegetative growth of plants.

Figure 4:
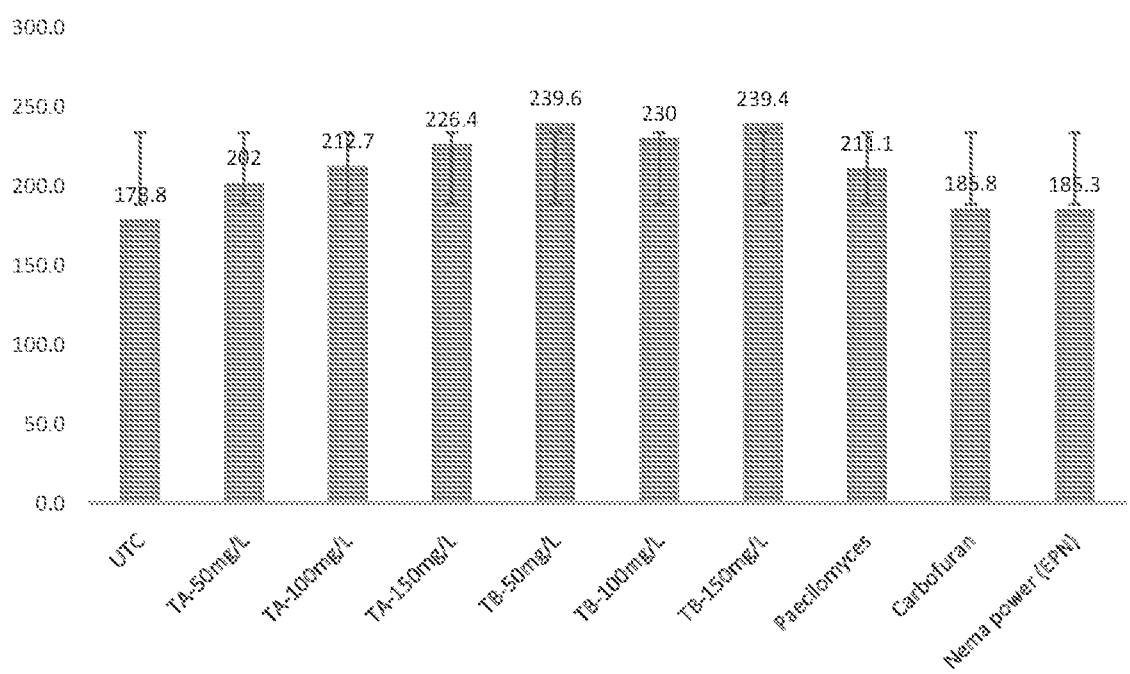
FIG. 4 is a graphical representation of the effect of chemicals or biological nematicides, as provided in Table 3, on length of plant shoots on Day 21 of treated plants as compared to untreated plants.

FIG. 4 depicts a graphical representation of effect of chemicals or biological nematicides, as provided in Table 3, on length of plant shoots on Day 21 of treated plants as compared to untreated plants. As depicted in FIG. 4, the application of the combination of chalcone 17 and chalcone 30 (TB50) at a dose of 10 mg per plant has shown high efficacy in maintaining the vegetative growth of plants. A 34% increase in shoot length was observed in TB50 when compared to untreated plants.

Similarly, the application of the combination chalcone 17 and chalcone 25 (TA150) at a dose of 30 mg per plant also has shown a high efficacy in maintaining the vegetative growth of plants. A 34% increase in shoot length was observed in TA150 treated plants as compared to untreated plants.

The chemical positive control carbofuran, or the biological positive controls EPN and *Paecilomyces lilacinus* did not have similar positive effect on the vegetative effect of plants.

Figure 5:
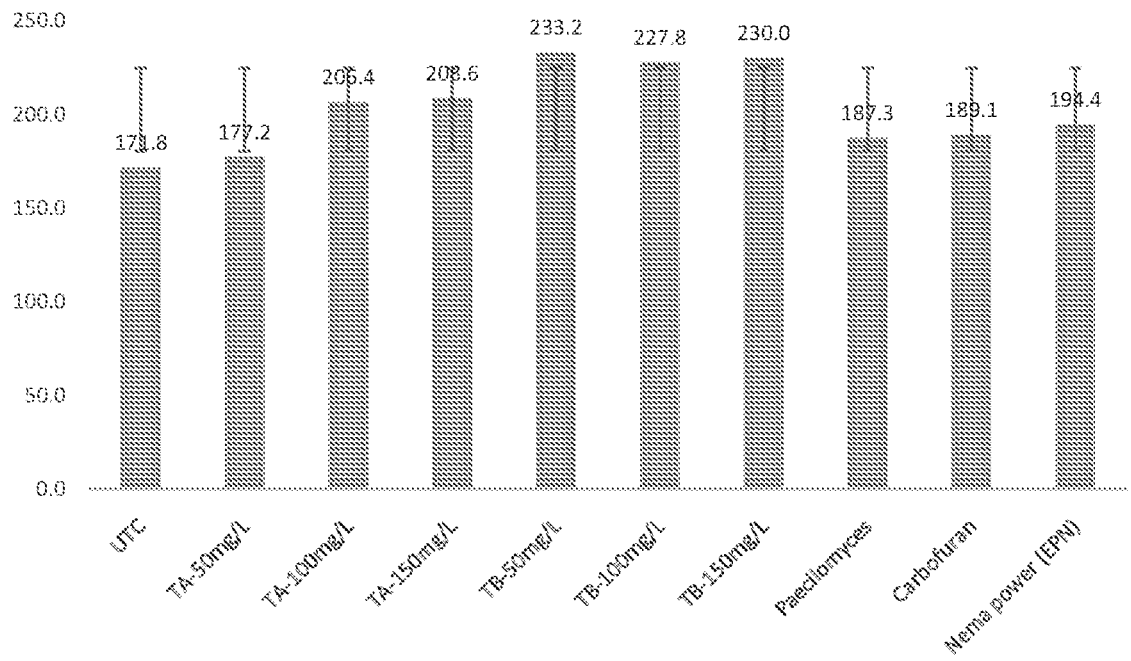
FIG. 5 is a graphical representation of the effect of chemicals or biological nematicides, as provided in Table 3, on length of plant shoots on Day 35 of treated plants as compared to untreated plants.

FIG. 5 depicts a graphical representation of the effect of chemicals or biological nematicides, as provided in Table 3, on length of plant shoots on Day 35 of treated plants as compared to untreated plants. As depicted in FIG. 5, the application of the combination of chalcone 17 and chalcone 30(TB50) at a dose of 10 mg per plant. TB50 has shown high efficacy in maintaining the vegetative growth of plants. A 36% increase in shoot length was observed in TB50 when compared to untreated plants.

Similarly, the application of the combination chalcone 17 and chalcone 25(TA150) at a dose of 10 mg per plant also has shown a high efficacy in maintaining the vegetative growth of plants. A 34% increase in shoot length was observed in TB150 treated plants as compared to untreated plants.

The chemical positive control carbofuran, or the biological positive controls EPN and *Paecilomyces lilacinus* did not show similar positive effect on the vegetative effect of plants.

B) Effect on Length of Plant Leaves

Figure 6:
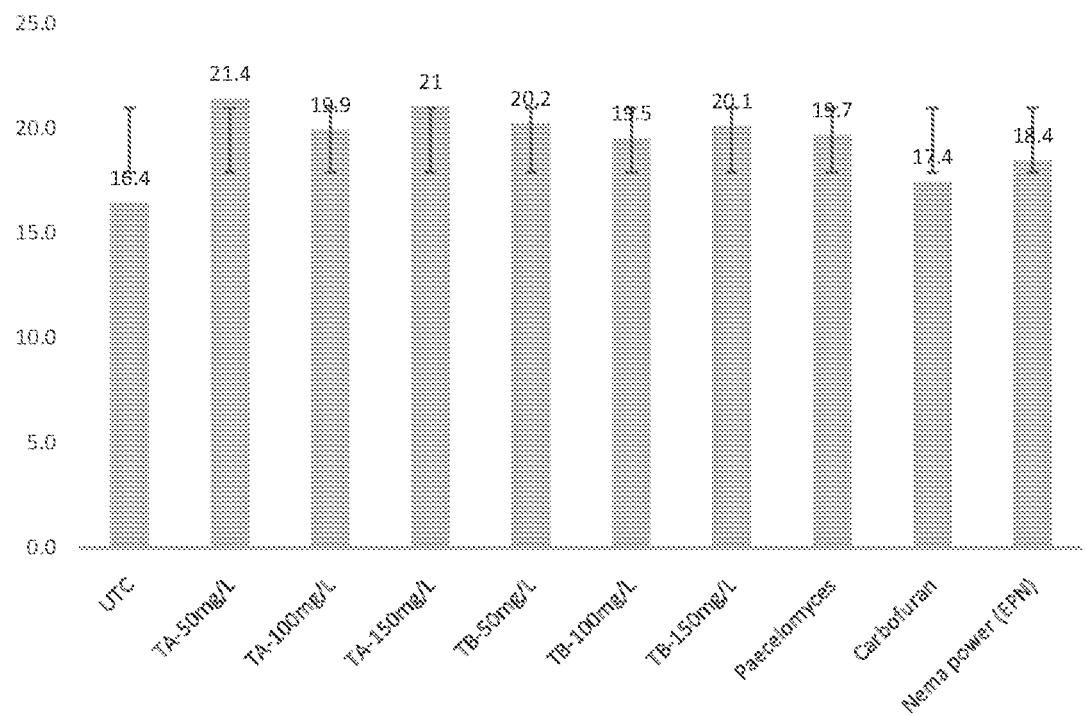
FIG. 6 is a graphical representation of the effect of chemicals or biological nematicides, as provided in Table 3, on length of plant leaves on Day 10 of treated plants as compared to untreated plants.

FIG. 6 depicts a graphical representation of effect of chemicals or biological nematicides, as provided in Table 3, on length of plant leaves on Day 10 of treated plants as compared to untreated plants.

As depicted in FIG. 6, the application of the combination chalcone 17 and chalcone 25 (TA50) at a dose of 10 mg per plant showed high efficacy in maintaining the vegetative growth of plants. A 30% increase in leaf length was observed in TA50 when compared to untreated plants.

Similarly, the application of the combination chalcone 17 and chalcone 30 (TB150) at a dose of 30 mg per plant also showed a high efficacy in maintaining the vegetative growth of plants.

A 30% increase in leaf length was observed in TA150 treated plants as compared to untreated plants.

The chemical positive control carbofuran, or the biological positive controls EPN and *Paecilomyces lilacinus* did not show similar positive effect on the vegetative effect of plants.

Figure 7:
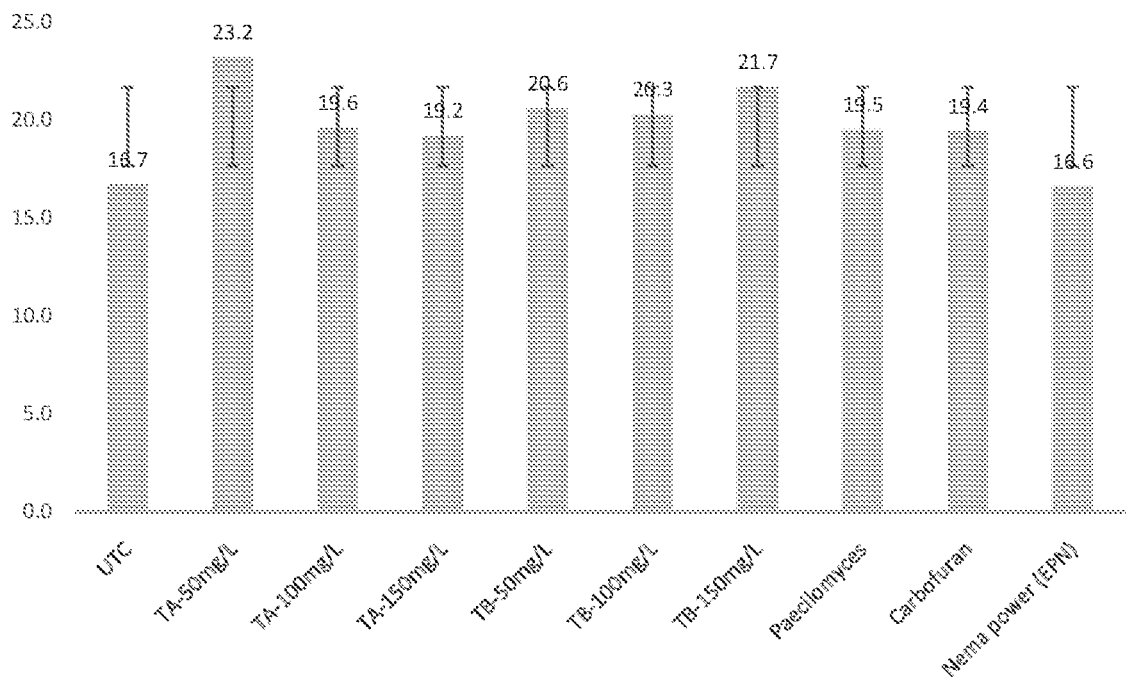
FIG. 7 is a graphical representation of the effect of chemicals or biological nematicides, as provided in Table 3, on length of plant leaves on Day 21 of treated plants as compared to untreated plants.

FIG. 7 depicts a graphical representation of effect of chemicals or biological nematicides, as provided in Table 3, on length of plant leaves on Day 21 of treated plants as compared to untreated plants.

As depicted in FIG. 7, the application of the combination chalcone 17 and chalcone 25(TA50) at a dose of 10 mg per plant showed high efficacy in maintaining the vegetative growth of plants. A 39% increase in leaf length was observed in TA50 when compared to untreated plants.

Similarly, the application of the combination chalcone 17 and chalcone 30 (TB150) at a dose of 30 mg per plant also showed a high efficacy in maintaining the vegetative growth of plants. A 30% increase in leaf length was observed in TB150 treated plants as compared to untreated plants.

The chemical positive control carbofuran, or the biological positive controls EPN and *Paecilomyces lilacinus* did not show similar positive effect on the vegetative effect of plants.

Figure 8:
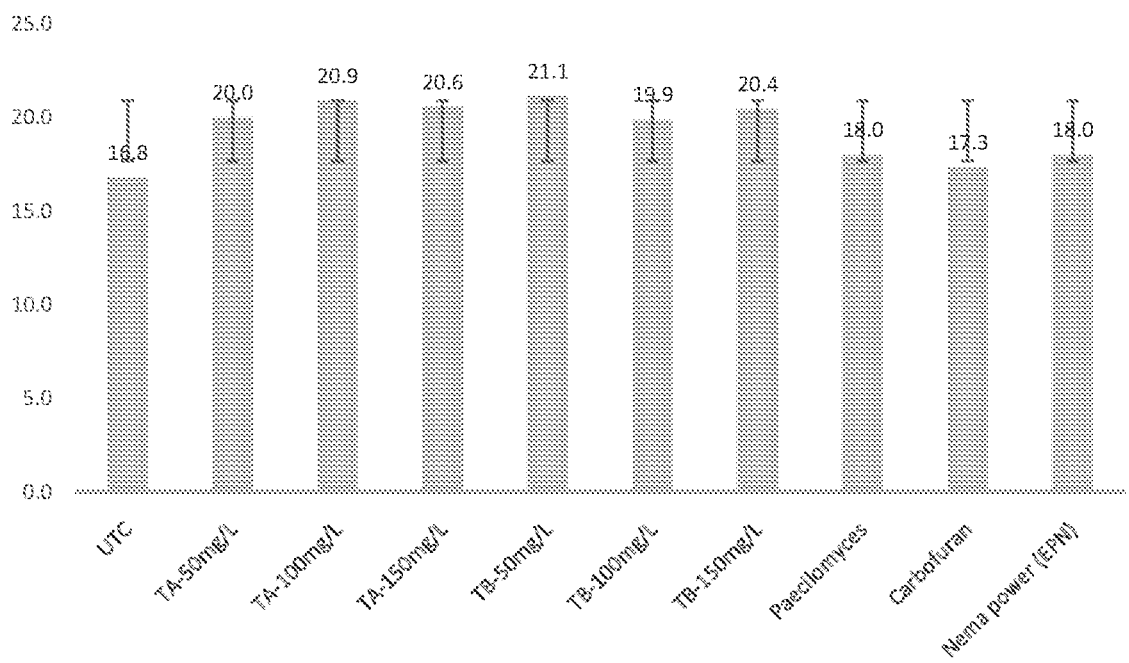
FIG. 8 is a graphical representation of the effect of chemicals or biological nematicides, as provided in Table 3, on length of plant leaves on Day 35 of treated plants as compared to untreated plants.

FIG. 8 depicts a graphical representation of effect of chemicals or biological nematicides, as provided in Table 3, on length of plant leaves on Day 35 of treated plants as compared to untreated plants.

As depicted in FIG. 8, the application of the combination chalcone 17 and chalcone 30 (TB50) at a dose of 10 mg per plant showed high efficacy in maintaining the vegetative growth of plants. A 30% increase in leaf length was observed in TB50 when compared to untreated plants.

Similarly, the application of the combination chalcone 17 and chalcone 25 (TA150) at a dose of 30 mg per plant showed a high efficacy in maintaining the vegetative growth of plants. A 30% increase in shoot length was observed in TB150 treated plants as compared to untreated plants.

The chemical positive control carbofuran, or the biological positive controls EPN and *Paecilomyces lilacinus* did not show similar positive effect on the vegetative effect of plants.

C) Effect on Number of Flowers Developed

Figure 9:
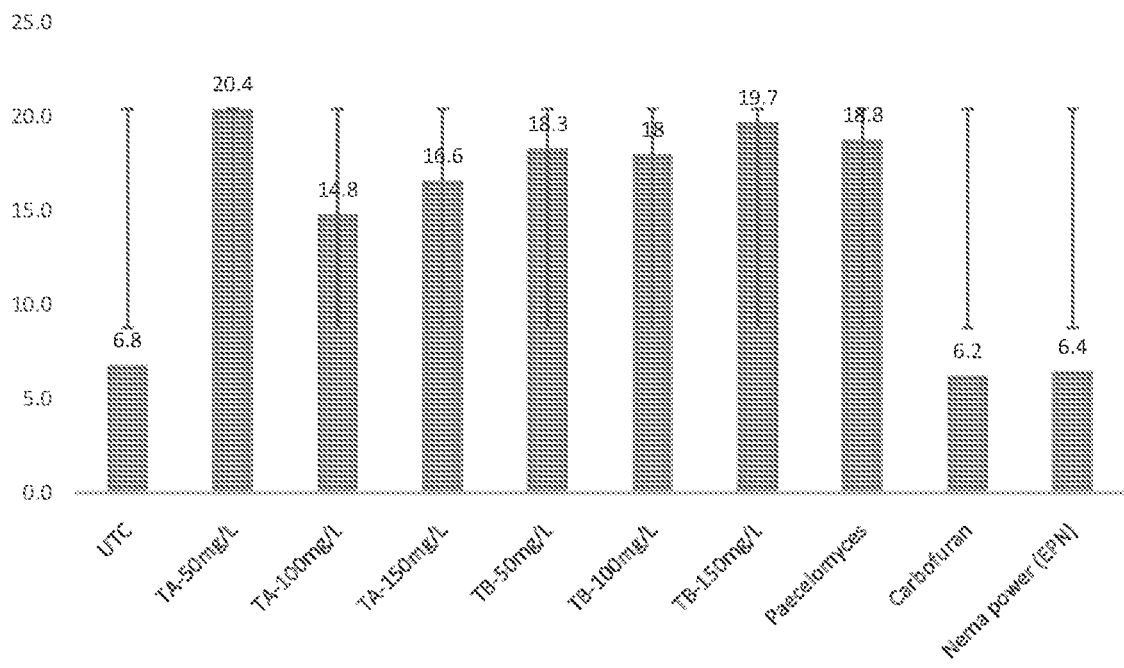
FIG. 9 is a graphical representation of the effect of chemicals or biological nematicides, as provided in Table 3, on number of flowers developed on Day 10 of treated plants as compared to untreated plants.

FIG. 9 depicts a graphical representation of effect of chemicals or biological nematicides, as provided in Table 3, on number of flowers developed on Day 10 of treated plants as compared to untreated plants.

As depicted in FIG. 9, the application of the combination chalcone 17 and chalcone 25 (TA50) at a dose of 10 mg per plant showed high efficacy in maintaining the reproductive growth of plants. A 200% increase in number of flowers was observed in TA50 when compared to untreated plants.

Similarly, the application of the combination chalcone 17 and chalcone 30 (TB150) at a dose of 30 mg per plant showed a high efficacy in maintaining the reproductive growth of plants. A 189% increase in number of flowers was observed in TB150 treated plants as compared to untreated plants.

The chemical positive control carbofuran, or the biological positive controls EPN and *Paecilomyces lilacinus* did not show similar positive effect on the reproductive effect of plants.

Figure 10:
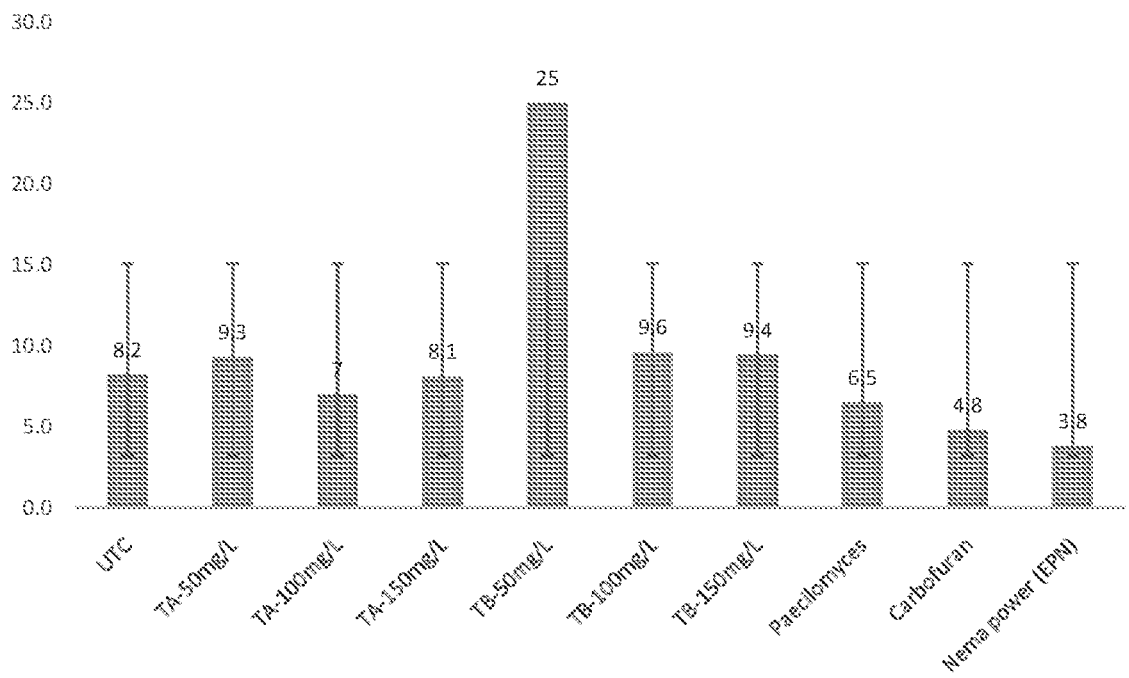
FIG. 10 is a graphical representation of the effect of chemicals or biological nematicides, as provided in Table 3, on number of flowers developed on Day 21 of treated plants as compared to untreated plants.

FIG. 10 depicts a graphical representation of effect of chemicals or biological nematicides, as provided in Table 3, on number of flowers developed on Day 21 of treated plants as compared to untreated plants.

As depicted in FIG. 10, the application of the combination chalcone 17 and chalcone 25 (TA50) at a dose of 10 mg per plant showed high efficacy in maintaining the reproductive growth of plants. A 187% increase in number of flowers was observed in TA50 when compared to untreated plants.

Similarly, the application of the combination chalcone 17 and chalcone 30 (TB50) at a dose of 10 mg per plant showed a high efficacy in maintaining the reproductive growth of plants. A 121% increase in number of flowers was observed in TB50 treated plants as compared to untreated plants.

The chemical positive control carbofuran, or the biological positive controls EPN and *Paecilomyces lilacinus* did not show similar positive effect on the reproductive effect of plants.

Figure 11:
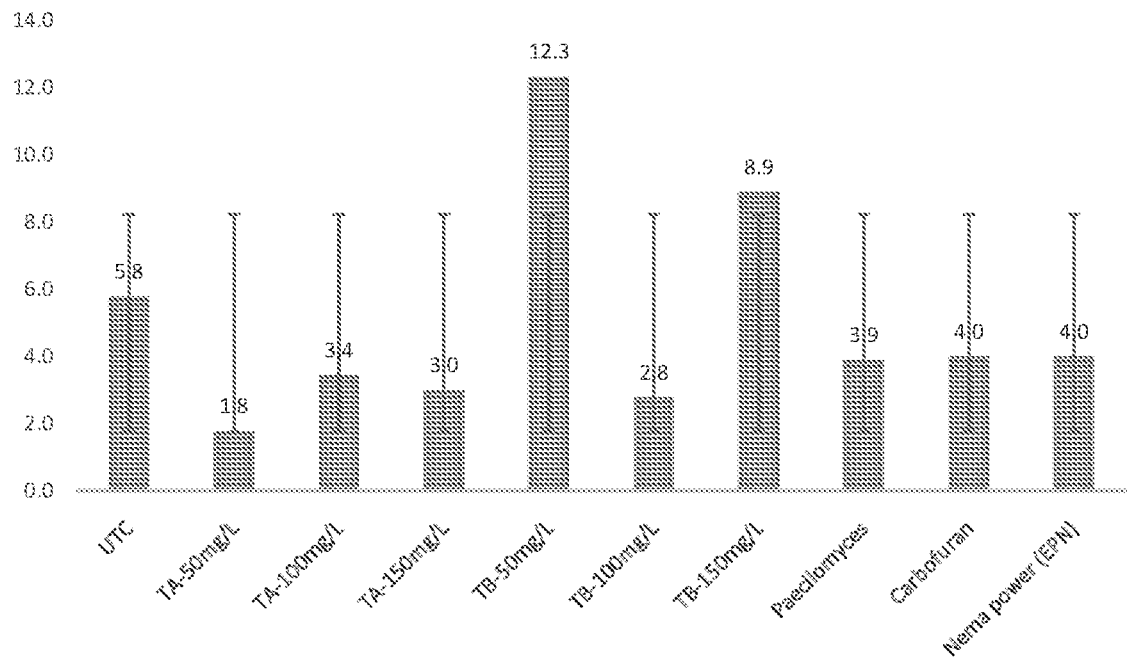
FIG. 11 is a graphical representation of the effect of chemicals or biological nematicides, as provided in Table 3, on number of flowers developed on Day 35 of treated plants as compared to untreated plants.

FIG. 11 depicts a graphical representation of effect of chemicals or biological nematicides, as provided in Table 3, on number of flowers developed on Day 35 of treated plants as compared to untreated plants.

As depicted in FIG. 11, the application of the combination chalcone 17 and chalcone 30 at a dose of 10 mg per plant (TB50). TB has shown high efficacy in maintaining the reproductive growth of plants. A 112% increase in number of flowers was observed in TB50 when compared to untreated plants.

The chemical positive control carbofuran, or the biological positive controls EPN and *Paecilomyces lilacinus* did not show similar positive effect on the reproductive effect of plants.

D) Effect on Number of Fruits Developed

Figure 12:
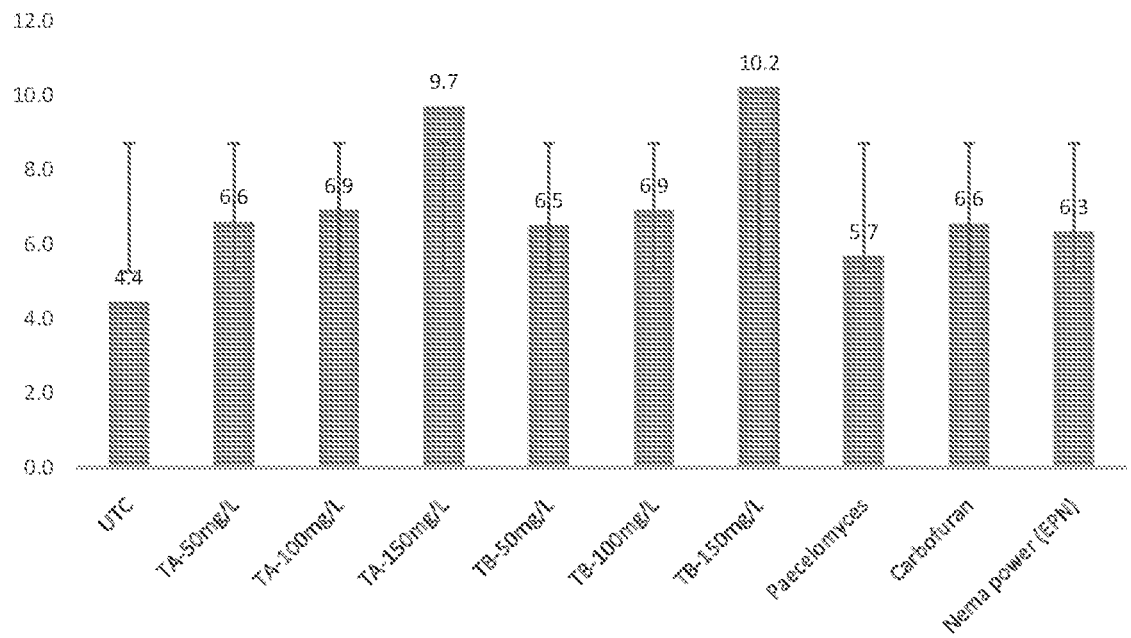
FIG. 12 is a graphical representation of the effect of chemicals or biological nematicides, as provided in Table 3, on number of fruits developed on Day 21 of treated plants as compared to untreated plants.

FIG. 12 depicts a graphical representation of effect of chemicals or biological nematicides, as provided in Table 3, on number of fruits developed on Day 21 of treated plants as compared to untreated plants.

As depicted in FIG. 12, the application of the combination chalcone 17 and chalcone 30 (TB150) at a dose of 30 mg per plant showed high efficacy in maintaining the reproductive growth of plants. A 131% increase in number of fruits was observed in TB150 when compared to untreated plants.

Similarly, the application of chalcone 17 and chalcone 25 (TA150) at a dose of 30 mg per plant showed a high efficacy in maintaining the reproductive growth of plants. A 120% increase in number of fruits was observed in TA150 treated plants as compared to untreated plants.

The chemical positive control carbofuran, or the biological positive controls EPN and *Paecilomyces lilacinus* did not show similar positive effect on the reproductive effect of plants.

Figure 13:
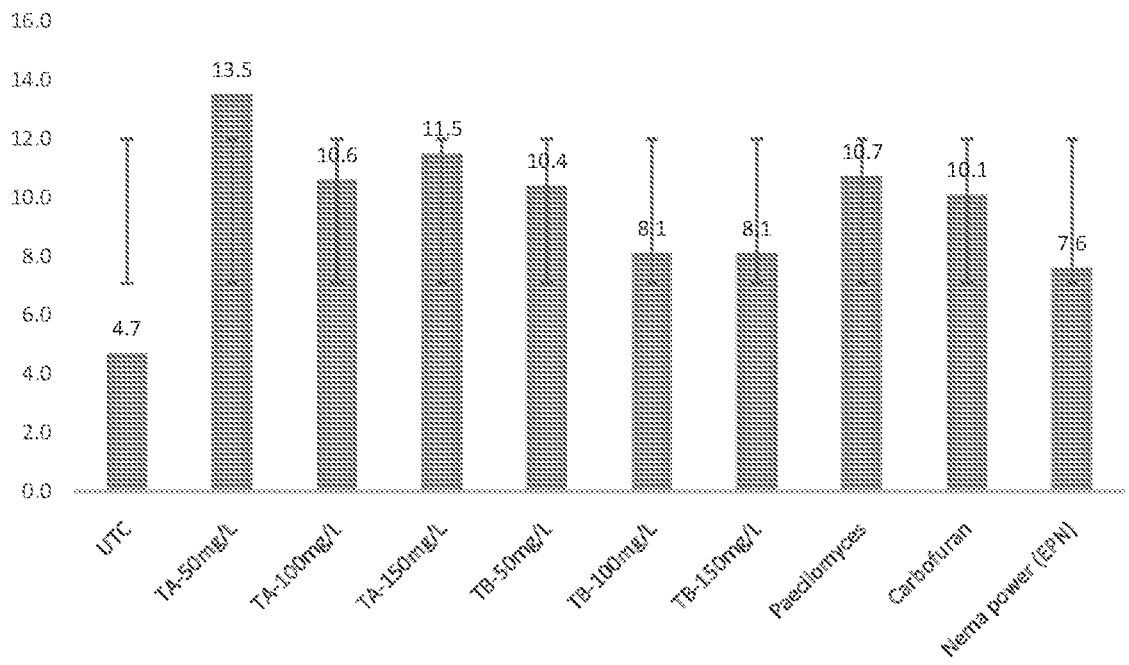
FIG. 13 is a graphical representation of the effect of chemicals or biological nematicides, as provided in Table 3, on number of fruits developed on Day 21 of treated plants as compared to untreated plants.

FIG. 13 depicts a graphical representation of effect of chemicals or biological nematicides, as provided in Table 3, on number of fruits developed on Day 21 of treated plants as compared to untreated plants.

As depicted in FIG. 13, the application of the combination chalcone 17 and chalcone 25 (TA50) at a dose of 10 mg per plant showed high efficacy in maintaining the reproductive growth of plants. A 187% increase in number of fruits was observed in TA50 when compared to untreated plants.

Similarly, the application of the combination chalcone 17 and chalcone 30 (TB50) at a dose of 10 mg per plant showed a high efficacy in maintaining the reproductive growth of plants. A 121% increase in number of fruits was observed in TB50 treated plants as compared to untreated plants.

The chemical positive control carbofuran, or the biological positive controls EPN and *Paecilomyces lilacinus* did not show similar positive effect on the reproductive effect of plants.

Figure 14:
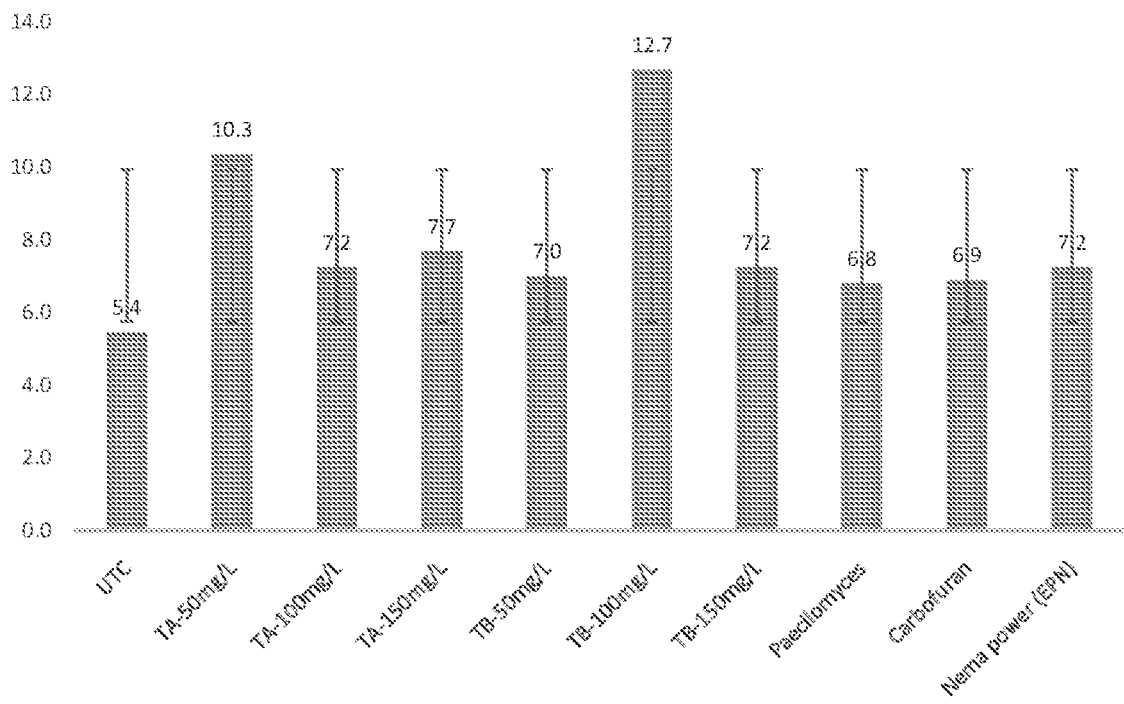
FIG. 14 depicts a graphical representation of the effect of chemicals or biological nematicides, as provided in Table 3, on number of fruits developed on Day 35 of treated plants as compared to untreated plants.

FIG. 14 depicts a graphical representation of effect of chemicals or biological nematicides, as provided in Table 3, on number of fruits developed on Day 21 of treated plants as compared to untreated plants.

As depicted in FIG. 14, the application of the combination chalcone 17 and chalcone 30 (TB100) at a dose of 20 mg per plant showed high efficacy in maintaining the reproductive growth of plants. A 135% increase in number of fruits was observed in TB150 when compared to untreated plants.

Similarly, the application of the combination chalcone 17 and chalcone 25 (TA50) at a dose of 10 mg per plant showed a high efficacy in maintaining the reproductive growth of plants. A 90% increase in number of fruits was observed in TA50 treated plants as compared to untreated plants.

The chemical positive control carbofuran, or the biological positive controls EPN and *Paecilomyces lilacinus* did not show similar positive effect on the reproductive effect of plants.

TABLE 4

Effect of chemical or biological nematicides on overall plat growth after 28 days of treatment compared to untreated treated plants

| Percentage Change compared to untreated | Average Shoot length | Average Leaf length | Average number of flowers | Average number of fruits |
| --- | --- | --- | --- | --- |
| TA50 | 9 | 30 | 200 | 50 |
| TA100 | 20.4 | 21.3 | 117.6 | 56.8 |
| TA150 | 25.5 | 28 | 144 | 120.4 |
| TB50 | 31.2 | 23.1 | 169 | 47.7 |
| TB100 | 18.3 | 18.9 | 164.7 | 56.8 |
| TB150 | 20.9 | 22.5 | 189.7 | 131.8 |
| Carbofuran | 3 | 6 | −9 | 50 |
| *Paecilomyces lilacinus* | 12.5 | 20 | 176.4 | 29.5 |
| Nema-power EPN | 4.6 | 12 | −6 | 43 |

As depicted in Table 4 provides the combination of chalcone 17 and chalcone 25, or chalcone 17 and chalcone 30 have negligible effect on overall growth of the treated plants, whereas if the plants were left untreated or were treated with other nematicides, they showed significant negative effect on the plant growth.

EXAMPLE 5

Figure 15:
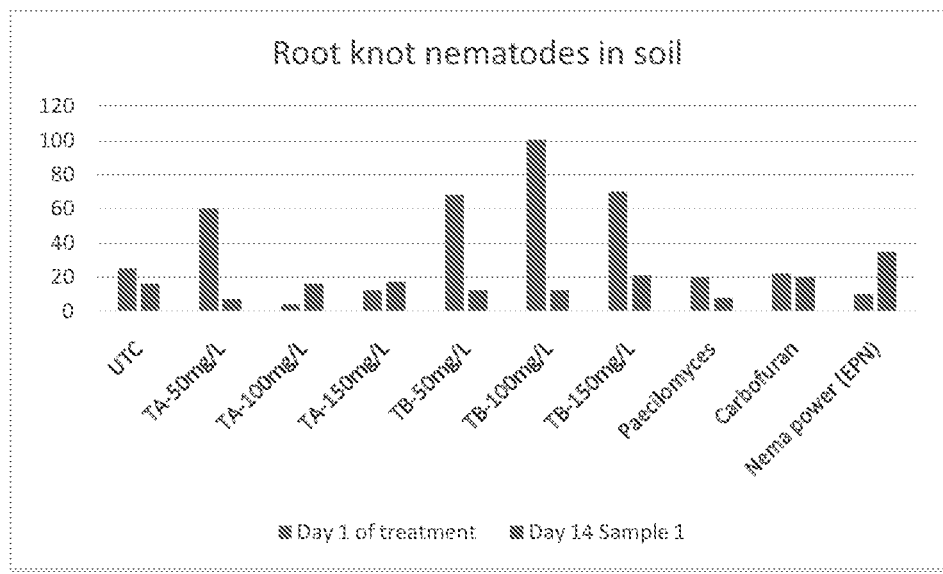
FIG. 15 depicts a graphical representation of the effect of chemicals or biological nematicides, as provided in Table 3, on root knot nematodes in soil after 14 days of treatment (sample 1) with respective nematicides.

Effect of Combination of Chalcone 17 and 25, or Chalcone 17 and 30 on Root Knot Nematodes in Soil FIG. 15 depicts a graphical representation of effect of chemicals or biological nematicides, as provided in Table 3, on root knot nematodes in soil after 14 days of treatment (sample 1) with respective nematicides.

Figure 16:
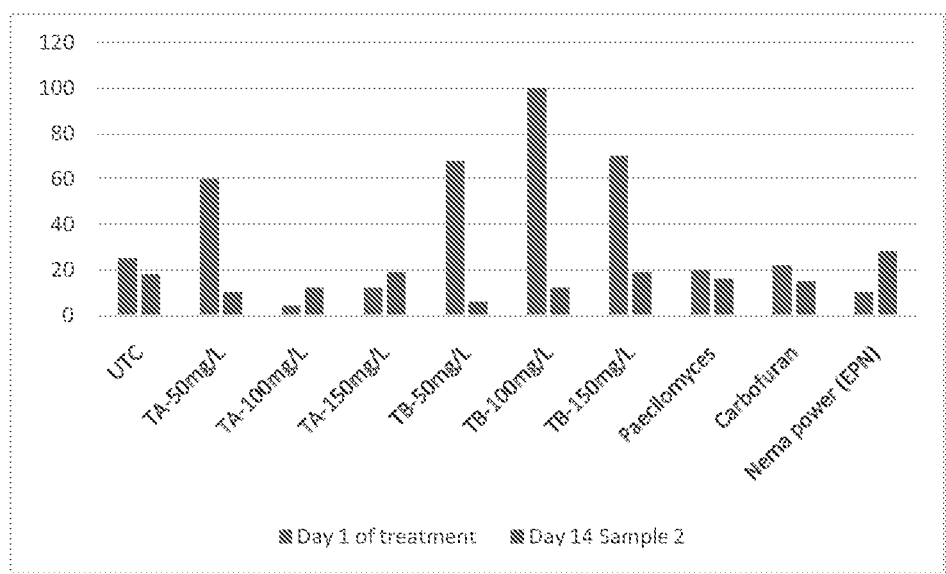
FIG. 16 depicts a graphical representation of the effect of chemicals or biological nematicides, as provided in Table 3, on root knot nematodes in soil after 14 days of treatment (sample 2) with respective nematicides.

FIG. 16 depicts a graphical representation of effect of chemicals or biological nematicides, as provided in Table 3, on root knot nematodes in soil after 14 days of treatment (sample 2) with respective nematicides.

As depicted in FIG. 15 and FIG. 16, the application of the combination chalcone 17 and chalcone 25 at a dose of 10 mg per plant (TA50) is sufficient to kill around 95% of the nematodes in the soil; no juvenile nematodes were observed; and the live nematodes were disfigured; whereas, a dose of 20 g or 30 mg of the same are significantly less effective.

This suggested that the best working dose of the combination of chalcone 17 and chalcone 25 is 10 mg per plant.

Similarly, the application of the combination chalcone 17 and chalcone 30 at a dose of 20 mg per plant (TB100) is sufficient to kill around 95% of the nematodes in the soil; and all the nematodes showed of nematostasis. Whereas a dose of 10 mg or 30 mg was less effective comparatively, however, at a dose of 30 mg per plant, all the nematodes observed were nematostatic, disfigured and paralyzed. This suggested that the best working dose of the combination of chalcone 17 and chalcone 30 is 20 mg per plant.

The chemical positive control carbofuran, or the biological positive controls EPN and *Paecilomyces lilacinus* did not show any significant effect on nematodes in the soil even at higher dosages.

This clearly shows that the chalcone combinations: chalcone 17 and chalcone 25, and chalcone 17 and chalcone 30 are highly potent killers of nematode in the soil.

Figure 17:
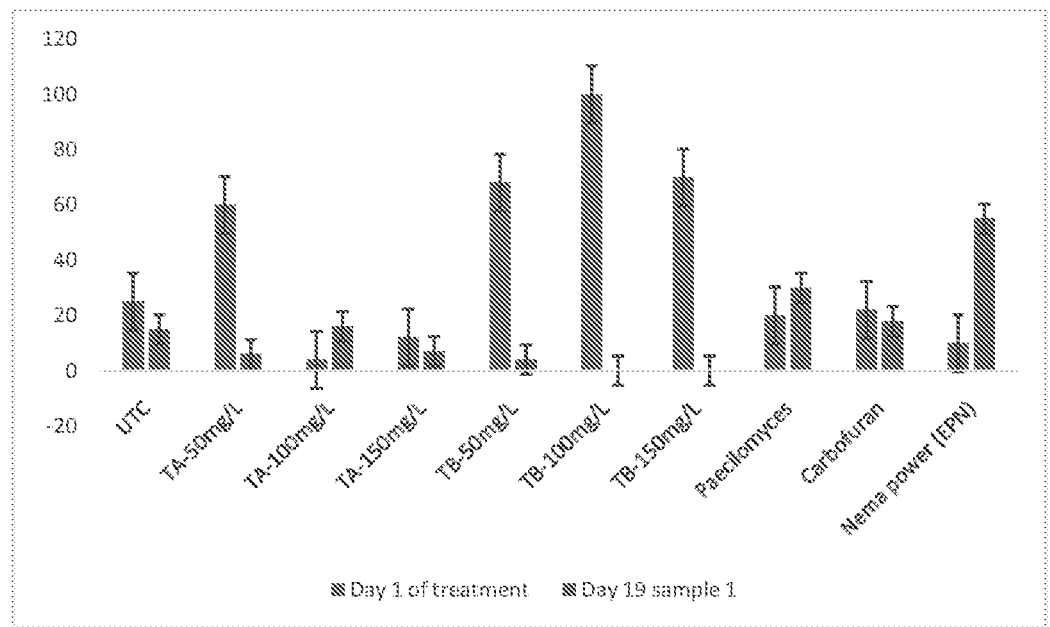
FIG. 17 depicts a graphical representation of the effect of chemicals or biological nematicides, as provided in Table 3, on root knot nematodes in soil after 19 days of treatment (sample 1) with respective nematicides.

FIG. 17 depicts a graphical representation of effect of chemicals or biological nematicides, as provided in Table 3, on root knot nematodes in soil after 19 days of treatment (sample 1) with respective nematicides.

Figure 18:
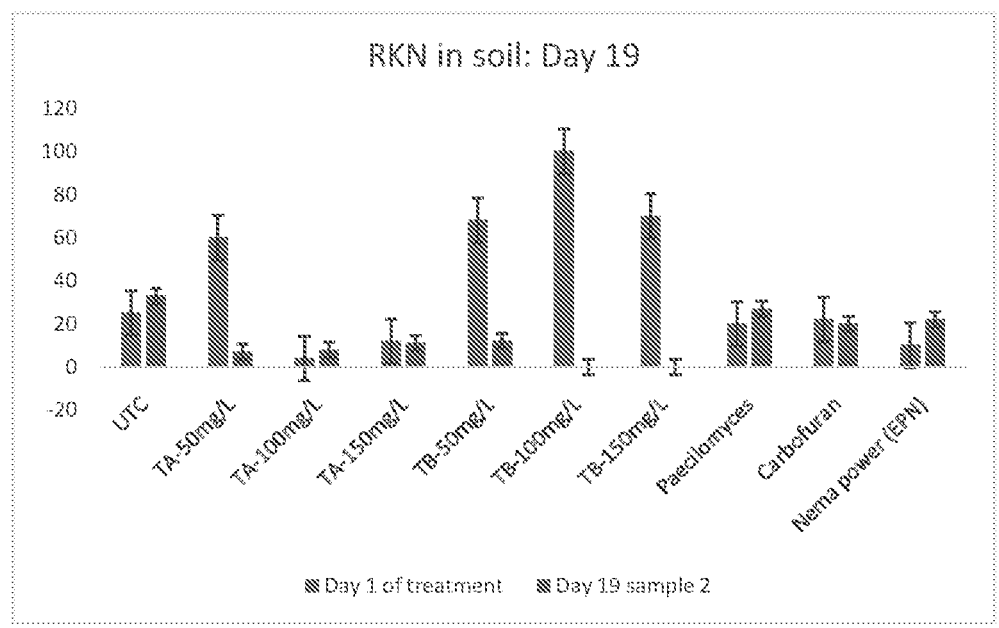
FIG. 18 depicts a graphical representation of the effect of chemicals or biological nematicides, as provided in Table 3, on root knot nematodes in soil after 19 days of treatment (sample 2) with respective nematicides.

FIG. 18 depicts a graphical representation of effect of chemicals or biological nematicides, as provided in Table 3, on root knot nematodes in soil after 19 days of treatment (sample 2) with respective nematicides.

Figure 19:
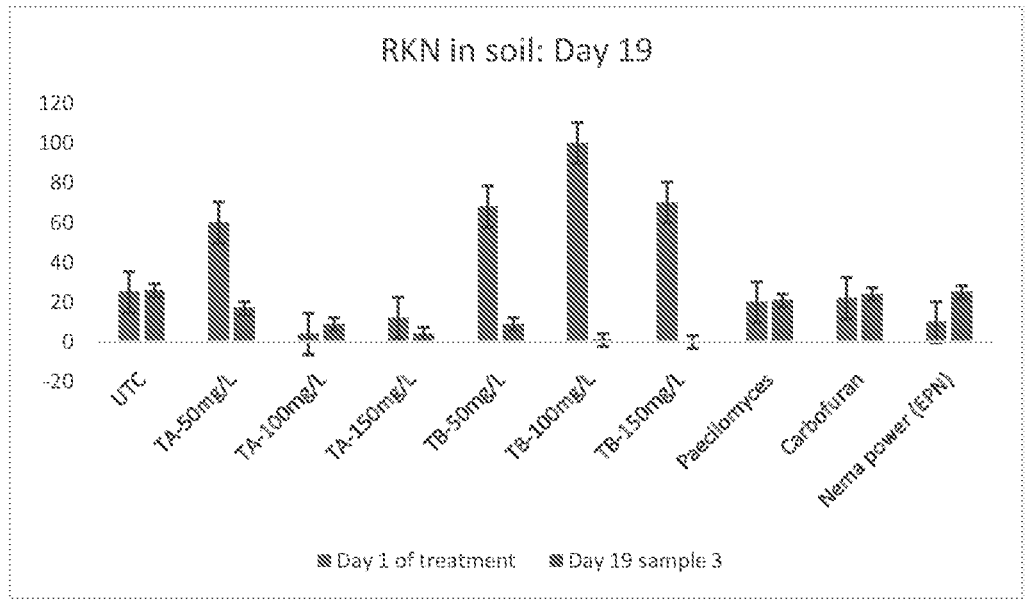
FIG. 19 depicts a graphical representation of the effect of chemicals or biological nematicides, as provided in Table 3, on root knot nematodes in soil after 19 days of treatment (sample 3) with respective nematicides.

FIG. 19 depicts a graphical representation of effect of chemicals or biological nematicides, as provided in Table 3, on root knot nematodes in soil after 19 days of treatment (sample 3) with respective nematicides.

As depicted in FIG. 17, FIG. 18, and FIG. 19, the application of the combination chalcone 17 and chalcone 25 (TA50) at a dose of 10 mg per plant showed high efficacy in killing and maintaining a small number of nematodes in soil after 19 days of treatment.

Similarly, the application of the combination chalcone 17 and chalcone 30 (TB100, and TB150) at a dose of 20 or 30 mg per plant showed a high efficacy in killing and maintaining a small number of nematodes in soil.

The chemical positive control carbofuran, or the biological positive controls EPN and *Paecilomyces lilacinus* do not have the same positive effect on the reproductive effect of plants.

EXAMPLE 6

Effect of Combination of Chalcone 17 and 25, or Chalcone 17 and 30 on Gall Formation in Roots of Infected Plants Galls are structures that form because of the abnormal growth activities of plants in response to gall-inducing organisms. Similarly, root-knot nematodes induce such gall formation in the roots of infected plants. The number of galls increases with increase in time of infection.

The effect of the chemicals and biological nematicides on gall formation in roots of infected plants was studied. Cucumber plants were infected with respective nematicides or left untreated (control) and the number of plant roots galled on Day 1 and after 25 days of treatment was counted. On Day 25 a second round of treatment with respective nematicides was carried out on the same plants; and again, the number of plant roots galled on Day 45 on each plant was counted.

Table 5 provides an overall effect of chemical or biological nematicides on gall formation on roots of cucumber plants in a polyhouse. The Root Gall index of 1-5 is provided, wherein 1=no galls,
2=1-25%,
3=26-50%,
4=51-75%, and
5=>75% of the roots galled.

TABLE 5

| Treatment | Effect of chemical or biological nematicides on gall formation in roots of infected plants | | |
|---|---|---|---|
| | Root gall index (Day 1) | Root gall index (Day 25 of treatment) | Root gall index (Day 45-20 days after second treatment) |
| UTC | 1 | 3 | 5 |
| TA100 | 1 | 1 | 2 |
| TB100 | 1 | 1 | 1 |
| Carbofuran | 1 | 2 | 4 |
| *Paecilomyces lilacinus* | 1 | 3 | 5 |
| Nemapower (EPN) | 1 | 3 | 5 |

Figure 20:
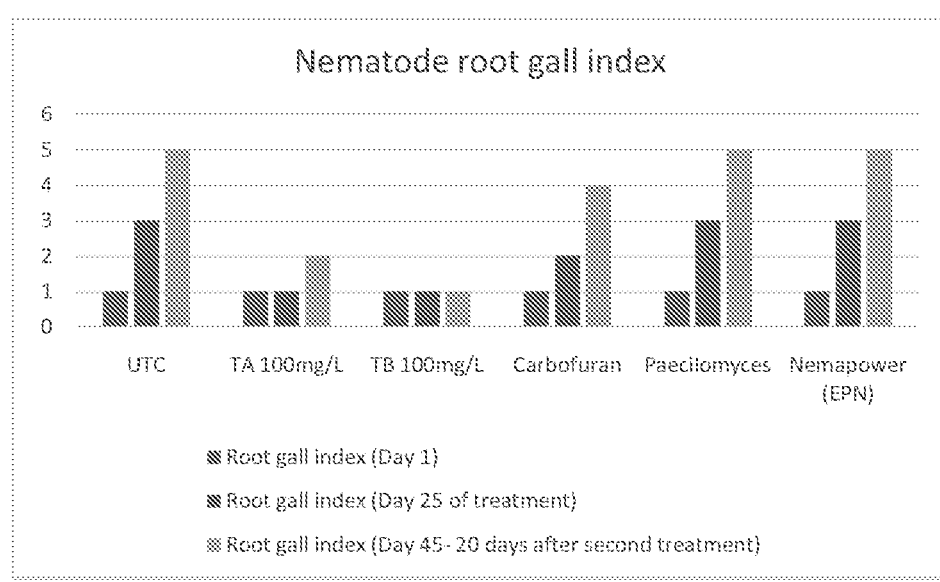
FIG. 20 depicts a graphical representation of the effect of chemical or biological nematicides as provided in Table 3 on extent of gall formation on roots of cucumber plants after 25 days of first treatment, followed by a second treatment on Day 25, and extent of gall formation on roots of cucumber plants after 20 days of second treatment i.e. Day 45.

FIG. 20 depicts a graphical representation of effect of chemical or biological nematicides as provided in Table 3 on extent of gall formation on roots of cucumber plants after 25 days of first treatment, followed by a second treatment on Day 25, and extent of gall formation on roots of cucumber plants after 20 days of second treatment i.e. Day 45.

As depicted in FIG. 20, the combination of chalcone 17 and chalcone 25 (TA100), and combination of chalcone 17 and chalcone 30 (TB100) at a dose of 30 mg per plant showed high efficacy in controlling gall formation in roots of cucumber plants. However, TB100 combination showed higher potency.

Similarly, the effect of different chalcones on tomato plants was studied. Tomato plants were grown in pots and maintained in a greenhouse. The concentration of chalcone used in this experiment was $10^{-4}$M. Gall rating in Chalcone treated plants was 2-3 on an average when compared to the average of 4 in other treatments.

We claim:

1. A composition for controlling a parasitic nematode comprising:
an effective amount of a compound of Formula 2:

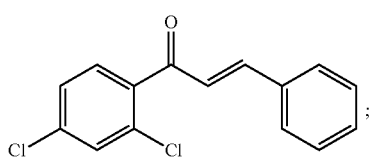

Formula 2 and
an effective amount of a compound of Formula 1:

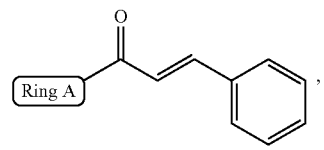

Formula 1,
wherein ring A is

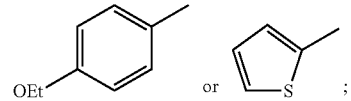

wherein,
the compound of Formula 1 and Formula 2 are present in a ratio of 1:1;
the composition has synergistic anti-nematode efficacy of 100% for parasitic nematodes;
and the total concentration of compound of Formula 1 and Formula 2 is $10^{-4}$-$10^{-6}$ M.

2. The composition as claimed in claim 1, wherein the composition further comprises at least one extender, an emulsifier and/or surfactants.

3. The composition as claimed in claim 1, wherein the composition further comprises at least one agrochemically active compound.

4. The composition as claimed in claim 3, wherein said agrochemically active compound is selected from the group consisting of fungicides, bactericides, insecticides, acaricides, nematicides, molluscicides, safeners, plant growth regulators, plant nutrients and biological control agents.

5. The composition as claimed in claim 1, wherein the composition is useful for agricultural purposes at the concentration of $10^{-4}$-$10^{-6}$ M.

6. The composition as claimed in claim 1, wherein compound of Formula 1 is
is a compound of Formula 3:

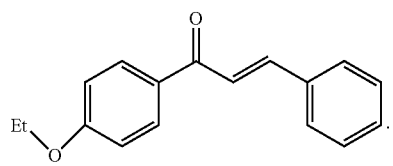

Formula 3

7. The composition as claimed in claim 1, wherein compound of Formula 1 is a compound of Formula 4:

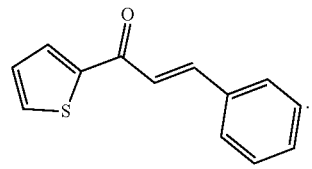

Formula 4

8. The composition as claimed in claim 1, wherein the total concentration of compound of Formula 2 and Formula 1 is $10^{-4}$-$10^{-5}$ M.

9. The composition as claimed in claim 1, wherein the total concentration of compound of Formula 2 and Formula 1 is $10^{-4}$ M.

10. The composition as claimed in claim 1, wherein the total concentration of compound of Formula 2 and Formula 1 is $10^{-5}$ M.

11. The composition as claimed in claim 1, wherein the composition has low activity against soil microorganisms.

12. The composition of claim 1, wherein the parasitic nematode is *Meloidogyne incognita*.

* * * * *